Jan. 4, 1966  E. W. PARRISH ETAL  3,227,223
FLAIL FOR BEETS AND THE LIKE
Filed Dec. 2, 1963
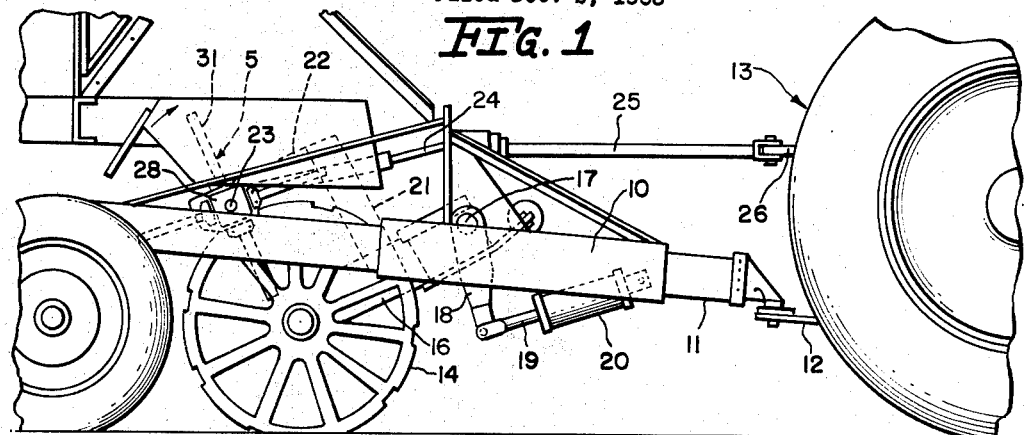
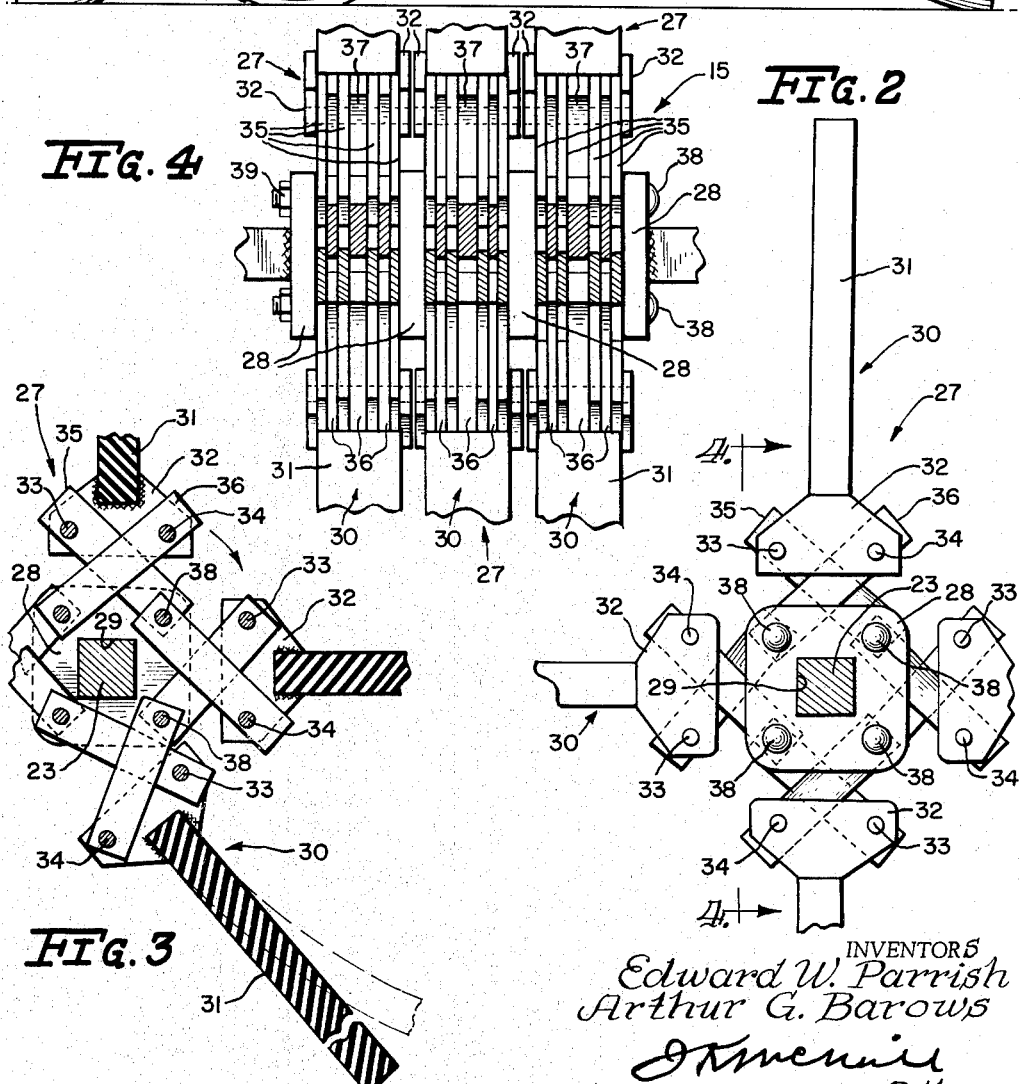
INVENTORS
Edward W. Parrish
Arthur G. Barows
Atty.

3,227,223
FLAIL FOR BEETS AND THE LIKE
Edward W. Parrish, Naperville, and Arthur G. Barows, Downers Grove, Ill., assignors to International Harvester Company, Chicago, Ill., a corporation of New Jersey
Filed Dec. 2, 1963, Ser. No. 327,250
6 Claims. (Cl. 171—58)

This invention relates to agricultural implements and particularly to beet machinery. More specifically, the invention concerns an improved rotatable beater or flail device for use in the harvesting of beets and the like.

The use of flails in the treatment and harvesting of root crops is well-known. For example, in the harvesting of beets, a well-known type of machine removes the foliage from the growing beet, pulls the beets from the ground and strikes them with a rotary flail device to shake dirt and debris therefrom while propelling them to other treating apparatus. However, until the present invention, prior flailing devices have been too costly and failed rapidly, resulting in frequent replacement. This invention, therefore, contemplates the provision of an improved flail assembly for beets and the like characterized by efficiency and economy.

Another object of the invention is the provision of a novel flail assembly for beets and the like wherein the flails are made of flexible material to strike the beets smartly without damaging them.

Another object of the invention is the provision of a novel flail assembly for beets and the like wherein the flails are not only made of flexible material but each flail is so connected to its revolving support that during rotation of the flail assembly and engagement of a flail with a beet, the flail is capable of yielding translationally relative to its support.

Other objects and advantages of the invention will become clear from the following detailed description when read in conjunction with the accompanying drawings wherein:

FIGURE 1 is a view in side elevation of the rear end of a tractor having a beet harvesting machine connected thereto incorporating the flail unit of this invention;

FIGURE 2 is an enlarged sectional view of a portion of the flail assembly of this invention mounted on a rotatable shaft;

FIGURE 3 is a sectional view similar to FIGURE 2 illustrating the deflection of one of the flails relative to its support and the axis of the shaft upon which it is mounted; and FIGURE 4 is a section taken on the line 4—4 of FIGURE 2.

Although many of the constructional details of the beet harvesting machine indicated in FIGURE 1 form no part of the invention as claimed herein, it might be noted that the machine includes a frame 10 having a hitch structure 11 connected to the drawbar 12 of a tractor 13.

The machine shown in FIGURE 1 is adapted to remove from the ground beets from which the foliage has already been removed, and this is accomplished by a pair of puller wheels 14, only one of which is shown, arranged to penetrate the ground on opposite sides of a beet row and to lift the beets therefrom until they are brought into the path of a beet flailing device 15. The puller wheels 14 are vertically movable relative to the frame and are carried by a supporting structure 16 affixed to a rockshaft 17 mounted on the frame and having an arm 18 connected to the piston rod 19 of a hydraulic cylinder 20 pivoted to the frame 10.

Also carried by the support 16 is an upright 21 having affixed thereto an arm 22 supporting a shaft 23, driven by conventional power transmission means 24 and 25 from the power takeoff shaft 26 of the tractor.

The flail assembly 15 is disposed with its axis above and rearwardly of the axis of puller wheels 14, to be revolved with the flails extending downwardly between adjacent puller wheels to strike beets lifted by the wheels and to discharge them rearwardly. Of course, in a multi-row machine additional flail assemblies 15 are provided on shaft 23 for each pair of puller wheels 14.

FIGURES 2 and 4 illustrate the construction of individual flail units 27 forming the assembly 15. Each unit 27 includes a pair of four-sided hub members 28, each having a square bore 29 to receive a square portion of shaft 23, it being understood that in the assembly 15 the two inner hub members 28 serve as common hubs for each unit 27.

A plurality of flail elements 30 are circumferentially arranged about the axis of shaft 23, and each comprises a flexible beet-engaging flail member 31 extending radially outwardly from the axis of shaft 23 and each having affixed to the radially inner end thereof a pair of broadened, axially spaced connectors 32 carrying transversely spaced pivot pins 33 and 34. Two pairs of links 35 are pivotally mounted at one end on pin 33 between connectors 32 and extend inwardly generally tangentially of the axis of shaft 23. A pair of links 36 are pivotally mounted on pin 34 and extend crosswise, scissor-fashion, of links 35, a link 36 passing between each pair of links 35. Also mounted on pin 33 is one end of a spacer link 37.

Pivot bolts 38 are equally spaced about the axis of shaft 23 and extend through hubs 28 of the assembly, as shown in FIGURE 4, each set of pins 33 and 34 being arranged parallel to adjacent pairs of bolts 38 in the neutral position of the flail members 30 as indicated in FIGURE 2. Thus, the connection of each flail member 30 is made by the pivotal mounting of the other ends of links 35 on one of the bolts 38, the other ends of links 36 and 37 being pivotally mounted upon another adjacent bolt 38. Each of the bolts 38 is preferably threaded at one end and provided with a nut 39.

As pointed out hereinbefore, in a neutral or at-rest position of the flail members 30, the links 35, 36 and 37 are disposed as in FIGURE 2, links 36 and 37 interdigitating with links 35, and with pivot pins 33 and 34 of each flail element 30 being parallel to and in alignment with the bolts 38 to which the ends of the associated links 35, 36 and 37 are connected. Substantially the same position is assumed as the result of centrifugal force when the flail assembly 15 is revolved in the direction of the arrow shown in FIGURE 3 during operation, but upon engagement of one of the flail elements 31 with a beet or the like, such deflection of the flail element 30 is accommodated as is shown in FIGURE 3. Not only is the element 31, which is preferably made of rubber-like material, flexible but also translational movement of the entire flail element occurs with respect to the axis of the shaft 23 and hub 28. Much greater flexibility occurs in the flail units of this invention than in any previously known rotary flail, promoting longer flail life and therefore greater economy and efficiency.

It is believed that the construction and the operation of the flail assembly of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In harvesting apparatus for beets and the like having a mobile frame, a shaft rotatably mounted on the frame, means serving as a hub carried by said shaft for rotation therewith, a plurality of radially extending flail members, and means for mounting said flail members on said hub means at circumferentially spaced locations about the axis of said shaft comprising, a pair of links each having one end pivotaly connected to the radially inner end of one of said flail members at locations spaced transversely with respect to the axis of said shaft, and means pivotally connecting the other ends of said links to said hub means at locations spaced transversely with respect to the axis of said shaft.

2. In harvesting apparatus for beets and the like having a mobile frame, a shaft rotatably mounted on the frame, means serving as a hub carried by said shaft for rotation therewith, a plurality of radially extending flail members, means for mounting said flail members on said hub means at circumferentially spaced locations about the axis of said shaft comprising, a pair of links each having one end pivotally connected to the radially inner end of one of said flail members at locations spaced transversely with respect to the axis of said shaft, said links being crossed, scissor-fashion, and means pivotally connecting the other ends of said links to said hub means at locations spaced transversely with respect to the axis of said shaft.

3. In harvesting apparatus for beets and the like having a mobile frame, a shaft rotatably mounted on the frame, means serving as a hub carried by said shaft for rotation therewith, a plurality of radially extending flails circumferentially spaced about the axis of said shaft, and means for mounting said flails on said hub means, each said flail including a connector member on the radially inner end thereof, pairs of pivot pins carried, respectively, by said connector member and said hub means, the pins of each pair being spaced transversely of the axis of said shaft, and a pair of links having their ends connected, respectively, to the pivot pins on said connector member and said hub means to accommodate angular movement of said flail relative to said hub means.

4. The invention set forth in claim 3, wherein the arrangement of said links is such as to accommodate translational movement of said flail and connector member relative to said hub means.

5. The invention set forth in claim 3, wherein said links are crossed, scissor-fashion.

6. The invention set forth in claim 3, wherein said flails are made of flexible material.

No references cited.

ABRAHAM G. STONE, *Primary Examiner.*
ANTONIO F. GUIDA, *Examiner.*